US012641485B2

(12) United States Patent
Liu

(10) Patent No.: US 12,641,485 B2
(45) Date of Patent: May 26, 2026

(54) INFORMATION CONTROL METHOD AND APPARATUS AND BASE STATION

(71) Applicant: VIVO MOBILE COMMUNICATION CO., LTD., Guangdong (CN)

(72) Inventor: Jiamin Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 473 days.

(21) Appl. No.: 18/091,100

(22) Filed: Dec. 29, 2022

(65) Prior Publication Data

US 2023/0140463 A1 May 4, 2023

Related U.S. Application Data

(63) Continuation of application No. PCT/CN2021/111776, filed on Aug. 10, 2021.

(30) Foreign Application Priority Data

Aug. 13, 2020 (CN) .......................... 202010814979.1

(51) Int. Cl.
| | | |
|---|---|---|
| *H04W 72/04* | (2023.01) | |
| *H04W 4/06* | (2009.01) | |
| *H04W 28/12* | (2009.01) | |
| *H04W 48/20* | (2009.01) | |
| *H04W 76/00* | (2018.01) | |
| *H04W 76/12* | (2018.01) | |
| *H04W 88/08* | (2009.01) | |

(52) U.S. Cl.
CPC ............. *H04W 28/12* (2013.01); *H04W 4/06* (2013.01); *H04W 48/20* (2013.01); *H04W 76/12* (2018.02)

(58) Field of Classification Search
None
See application file for complete search history.

(56) References Cited

U.S. PATENT DOCUMENTS

2021/0274417 A1    9/2021  Zhou et al.
2023/0319909 A1*  10/2023  Dai ....................... H04W 76/40
                                                                370/329

FOREIGN PATENT DOCUMENTS

| CN | 102355708 A | 2/2012 |
|---|---|---|
| CN | 110139386 A | 8/2019 |
| CN | 110536377 A | 12/2019 |

(Continued)

OTHER PUBLICATIONS

First Office Action for Japanese Application No. 2023-509810, dated Dec. 15, 2023, 6 Pages.

(Continued)

*Primary Examiner* — Maharishi V Khirodhar
(74) *Attorney, Agent, or Firm* — BROOKS KUSHMAN P.C.

(57) ABSTRACT

An information control method and apparatus and a base station. The information control method applied to a base station includes: transmitting first signaling from a CU of the base station to a DU of the base station, where the first signaling includes information about MBS traffic, and the information about MBS traffic is used to indicate the DU that the MBS traffic is to be transmitted in a first mode; generating configuration information related to the MBS traffic in the DU; and transmitting the configuration information from the DU to the CU.

20 Claims, 7 Drawing Sheets

(56) References Cited

FOREIGN PATENT DOCUMENTS

| CN | 110798898 A | 2/2020 | |
| JP | 2023536000 A | 8/2023 | |
| KR | 20220104255 A * | 7/2022 | |
| WO | 2020149575 A1 | 7/2020 | |
| WO | WO-2021109429 A1 * | 6/2021 | ........... H04L 47/806 |
| WO | 2022027443 A1 | 2/2022 | |

OTHER PUBLICATIONS

ZTE, Sanechips "Dynamic transmission area control for CU/DU split scenario" 3GPP TSG-RAN WG3 #109-e, Online, Aug. 2020, R3-205247, 4 Pages.

LG Electronics "Switching between multicast and unicast in RAN" 3GPP TSG-RAN WG3 #109-e, Online, Aug. 2020, R3-205253, 4 Pages.

First Office Action for Chinese Application No. 202010814979.1, dated Jun. 13, 2022, 9 Pages.

Vivo, "Dynamic PTM PTP switch for RRC Connected UE" 3GPP TSG-RAN WG2 Meeting #11, E-Meeting, Aug. 2020, R2-2007034, 7 Pages.

Intel Corporation, "MBS architecture discussion" 3GPP TSG-RAN WG3 Meeting #109-e, E-Meeting, Aug. 2020, R3-204744, 5 Pages.

Lenovo, Motorola Mobility, "Mode Decision and Dynamic Switching between PTM and PTP" 3GPP TSG-RAN WG3 Meeting #109e, E-Meeting, Aug. 2020, R3-204921, 3 Pages.

Lenovo, Motorola Mobility, "Overview on NG RAN to support NR Multicast and Broadcast Services" 3GPP TSG-RAN WG3 Meeting #109e, E-Meeting, Aug. 2020, R3-204920, 4 Pages.

International Search Report and Written Opinion for Application No. PCT/CN2021/111776, dated Nov. 9, 2021, 7 Pages.

Lenovo, Motorola Mobility, "5G Mbs Transmission Mode and Area Control" 3GPP TSG-RAN WG3 Meeting #109e, E-Meeting, Aug. 2020, R3-204923, 3 Pages.

* cited by examiner

Network-side device

12

11

11

Terminal

Terminal

| UE | gNB-DU | gNB-CU | AMF |
|---|---|---|---|
| NAS | | | NAS |
| RRC | | RRC | |
| PDCP | | PDCP | |
| RLC | RLC | | |
| MAC | MAC | | |
| PHY | PHY | | |

1

INFORMATION CONTROL METHOD AND APPARATUS AND BASE STATION

CROSS-REFERENCE TO RELATED APPLICATIONS

This application is a continuation of International Application No. PCT/CN2021/111776 filed on Aug. 10, 2021, which claims priority to Chinese Patent Application No. 202010814979.1, filed on Aug. 13, 2020, which are incorporated herein by reference in their entireties.

TECHNICAL FIELD

This application belongs to the field of communications technologies, and specifically, relates to an information control method and apparatus and a base station.

BACKGROUND

Currently, multicast broadcast service (MBS) is typically implemented based on a base station. With the development of communications technologies, the central unit (CU)-distributed unit (DU) architecture is introduced into existence forms of base stations to meet various requirements. In the CU-DU architecture, a base station includes a CU and a DU that are separate, and a standardized interface is provided between the CU and the DU. However, after the CU-DU architecture is introduced, how transmission of MBS traffic is supported has not currently been determined yet.

SUMMARY

An objective of embodiments of this application is to provide an information control method and apparatus and a base station.

According to a first aspect, an information control method is provided, where the method is applied to a base station, the base station includes a CU and a DU, and the method includes:

transmitting first signaling from the CU to the DU, where the first signaling includes information about MBS traffic, and the information about MBS traffic is used to indicate that the DU transmits the MBS traffic in a first mode;

generating configuration information related to the MBS traffic in the DU; and transmitting the configuration information from the DU to the CU.

According to a second aspect, an information control apparatus is provided, where the apparatus is applied to a base station, and the apparatus includes a CU and a DU, where the CU is configured to transmit first signaling to the DU, where the first signaling includes information about MBS traffic, and the information about MBS traffic is used to indicate that the DU transmits the MBS traffic in a first mode; and the DU is configured to generate configuration information related to the MBS traffic, and transmit the configuration information to the CU.

According to a third aspect, a base station is provided, where the base station includes a processor, a memory, and a program or instructions stored in the memory and capable of running on the processor, and when the program or instructions are executed by the processor, the steps of the method according to the first aspect are implemented.

According to a fourth aspect, a readable storage medium is provided, where the readable storage medium stores a program or instructions, and when the program or instructions are executed by a processor, the steps of the method according to the first aspect are implemented.

According to a fifth aspect, a chip is provided, where the chip includes a processor and a communications interface, the communications interface is coupled to the processor, and the processor is configured to run a program or instructions, to implement the method according to the first aspect.

According to a sixth aspect, a computer program product is provided, and is stored in a non-volatile readable storage medium, where the computer program product is executed by at least one processor to implement the method according to the first aspect.

According to a seventh aspect, a base station is provided, where the base station is configured to implement the method according to the first aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application. The following clearly and completely describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that data used in this way is interchangeable in appropriate circumstances so that the embodiments of this application can be implemented in other orders than the order illustrated or described herein. In addition, "first" and "second" are usually used to distinguish objects of the same category, but do not limit the number of the objects. For example, there may be one or more first objects. In addition, in this specification and claims, "and/or" indicates at least one of connected objects, and the character "/" generally indicates an "or" relationship between associated objects.

It should be noted that the technologies described in the embodiments of this application are not limited to long term evolution (LTE)/LTE-advanced (LTE-A) systems, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technologies described herein may be used in the above-mentioned systems and radio technologies as well as other systems and radio technologies. However, in the following descriptions, a new radio (NR) system is described for an illustration purpose, and NR terms are used in most of the following descriptions, although these technologies may also be applied to applications other than an NR system application, for example, a $6^{th}$ generation (6G) communications system.

Figure 1:
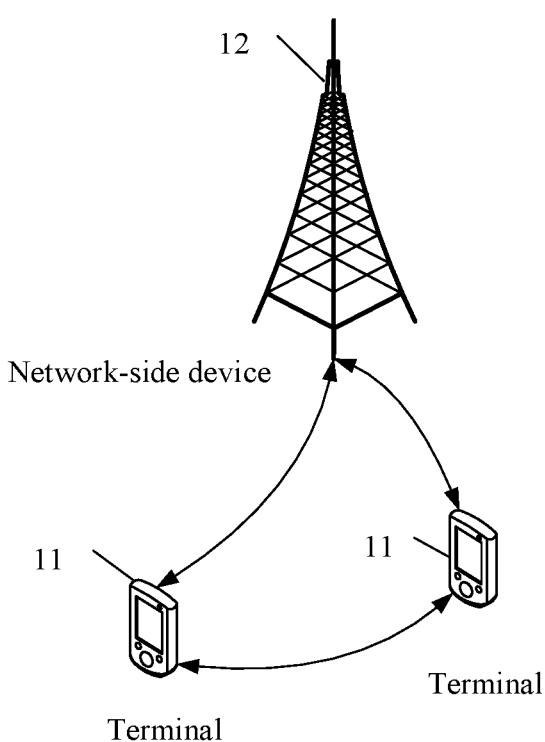
FIG. 1 is a block diagram of a wireless communications system according to an embodiment of this application.

FIG. 1 is a block diagram of a wireless communications system to which an embodiment of this application is applicable. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), a wearable device, a vehicle user equipment (VUE), or pedestrian user equipment (PUE). The wearable device includes a band, a headset, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a WLAN access point, a Wi-Fi node, a transmitting receiving point (TRP), or another appropriate term in the art. Provided that the same technical effect is achieved, the base station is not limited to a specific technical term. It should be noted that the base station in the NR system is only used as an example in the embodiments of this application, but a specific type of the base station is not limited.

For ease of understanding this application, the following content is described first.

Figure 2:
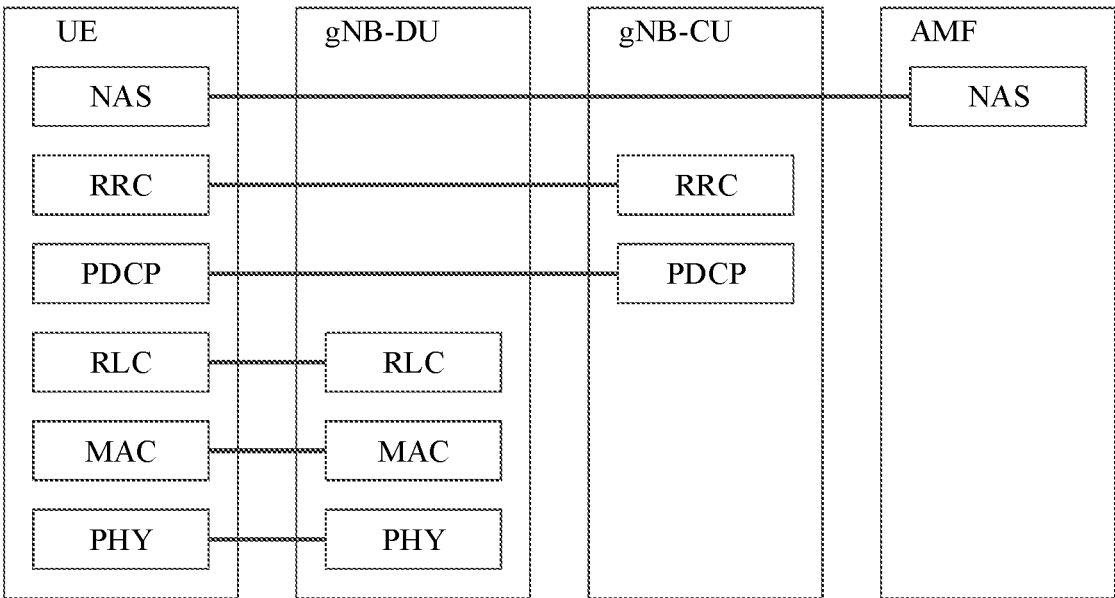
FIG. 2 is a schematic diagram of a protocol stack architecture of a control plane for unicast traffic in a CU-DU architecture according to an embodiment of this application.

FIG. 2 is a schematic diagram of a typical protocol stack architecture of a control plane of UE for unicast traffic in a CU-DU architecture. As shown in FIG. 2, the UE includes a non-access stratum (NAS) entity, a radio resource control (RRC) entity, a packet data convergence protocol (PDCP) entity, a radio link control (RLC) entity, a media access control (MAC) entity, and a physical layer (PHY) entity. A CU in a base station gNB includes an RRC entity and a PDCP entity, corresponding to the RRC entity and the PDCP entity of the UE respectively. A DU in the gNB includes an RLC entity, a MAC entity, and a PHY entity. To be specific, the RLC entity and protocol layer entities below the RLC entity are located in the DU, and correspond to the RLC entity, the MAC entity, and the PHY entity of the UE respectively. The NAS entity of the UE corresponds to a NAS entity in a core network, for example, an access management function (AMF).

It should be noted that a user plane of the UE has a protocol stack architecture similar to that in FIG. 2, where a service data adaptation protocol (SDAP) entity and a PDCP entity are located in a CU, and an RLC entity and protocol layer entities below the RLC entity are located in a DU.

In this embodiment of this application, a similar protocol stack division manner may be used for MBS traffic based on a protocol stack division manner between the CU and the DU for the unicast traffic. However, differences are mainly embodied in the following aspects:

(1) For UE receiving multicast traffic, the multicast traffic is not directly controlled by a non-access stratum (NAS) of the UE. Instead, a core network multicast entity and a base station (a gNB-CU) interact to determine that the multicast traffic is to be delivered to the base station (a gNB-DU), and then the base station (the gNB-DU) determines whether transmission is to be performed through an air interface and which transmission mode is to be used.

(2) For multicast traffic, some control information is still required, for example, neighboring cell support information about the multicast traffic, and a traffic identifier, scheduling, a cycle, resource allocation, and other information about the multicast traffic. If the control information is transmitted to UE by using dedicated signaling, a processing manner is similar to that of existing RRC signaling of UE. However, if the control information is transmitted to UE by using broadcast or multicast signaling, a protocol stack architecture in this transmission mode may be different from a protocol stack architecture for unicast traffic. For example, in a case that no operation such as a security operation is provided, a PDCP entity may be default or perform transparent transmission.

(3) For multicast traffic, if a point-to-multipoint (Point To Multipoint, PTM) mode of an air interface is used for transmission, an implementation of a protocol stack entity may be that an SDAP entity is default and/or a PDCP entity is default; or whether a related protocol stack entity is default may be determined based on a configuration.

(4) For multicast traffic, if a point-to-point (Point To Point, PTP) mode of an air interface is used for transmission, an implementation of a protocol stack entity may be that an SDAP entity is default and/or a PDCP entity default; or whether a related protocol stack entity is default is determined based on a configuration; or a protocol stack entity may be mapped in different manners.

Optionally, in the CU-DU architecture, function division and a protocol stack entity architecture related to multicast traffic include a control plane and a user plane. A basic idea is as follows: An L3 related protocol stack entity is located in a CU, an L2 protocol stack entity and protocol stack entities below the L2 are located in a DU, the CU is responsible for an RRC signaling process of UE, and the DU is responsible for information exchange at the L2 or below.

Figure 3:
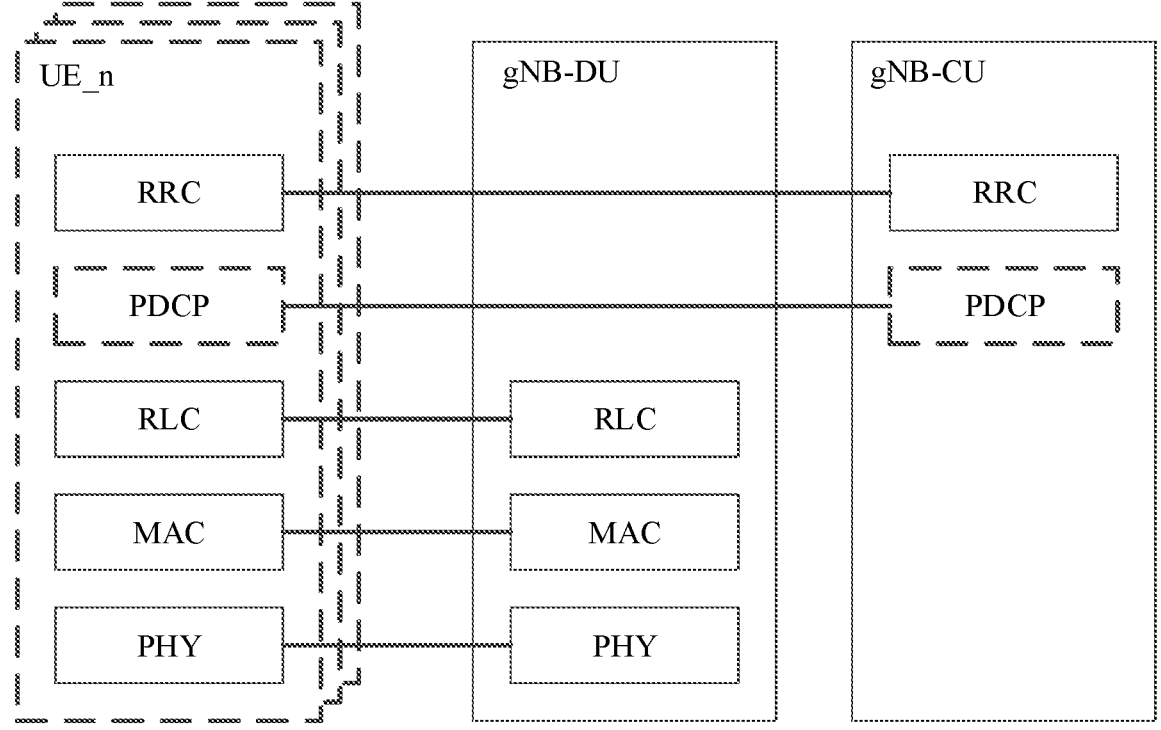
FIG. 3 is a schematic diagram of a protocol stack architecture of a control plane for multicast traffic in a CU-DU architecture according to an embodiment of this application.

Optionally, for a control plane of multicast traffic, a control plane process related to transmission of the multicast traffic is mainly control information notification of an air interface. If dedicated RRC signaling is used for notification, an existing unicast protocol stack division manner may be completely reused as a protocol stack division manner. However, if broadcast or multicast RRC signaling is used for notification, an implementation of a protocol stack architecture may be shown in FIG. 3. Whether a PDCP entity is default may be determined based on a stipulation in a protocol or a configuration. An RLC mode may be determined by default or through configuration. For example, the RLC mode is an unacknowledged mode (UM), or a transparent mode (TM).

Figure 4:
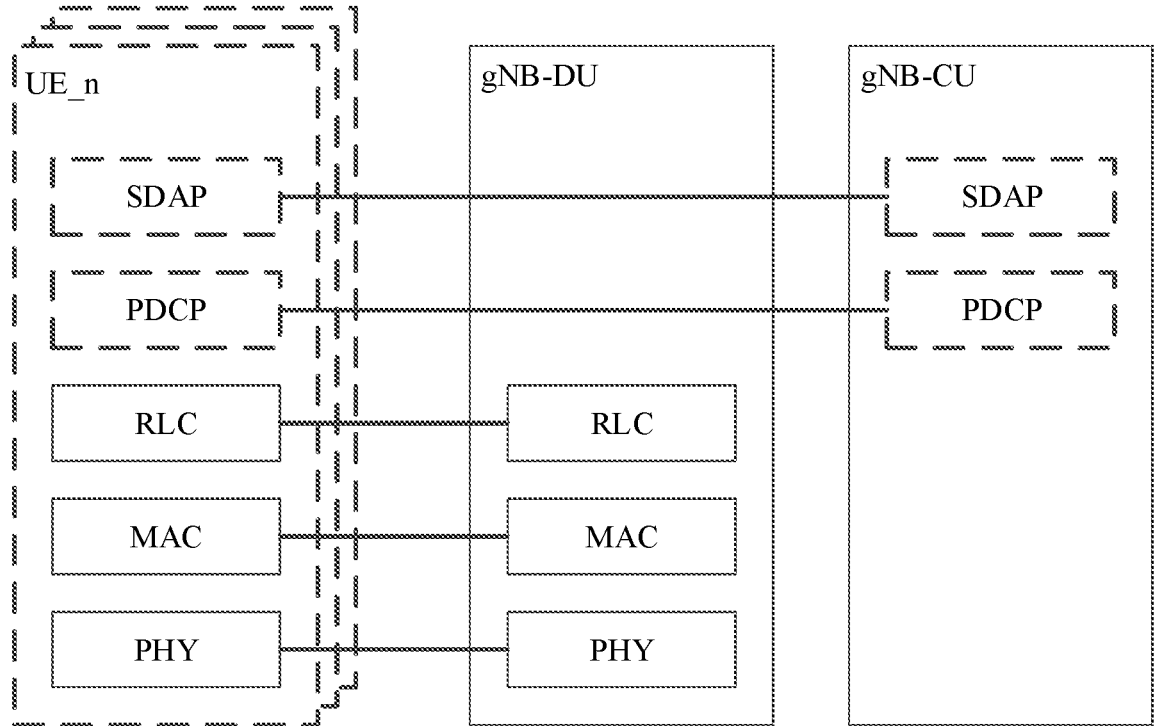
FIG. 4 is a first schematic diagram of a protocol stack architecture of a user plane in a CU-DU architecture according to an embodiment of this application.

Optionally, for a user plane of multicast traffic, if a PTM mode is used for transmission, an implementation of a protocol stack architecture may be shown in FIG. 4. Whether a PDCP entity is default may be determined based on a stipulation in a protocol or a configuration. Whether an SDAP entity is default may also be determined based on a stipulation in a protocol or a configuration. Particularly, because SDAP entities are not symmetric entities, an SDAP entity on a gNB-CU side may be used for performing mapping from a multicast quality of service (QoS) stream to multicast traffic radio bearer (Multicast Services Radio Bearer, MRB), and an SDAP entity on a UE side that serves as a receive end does not perform an actual function and therefore can still be default.

Figure 5:
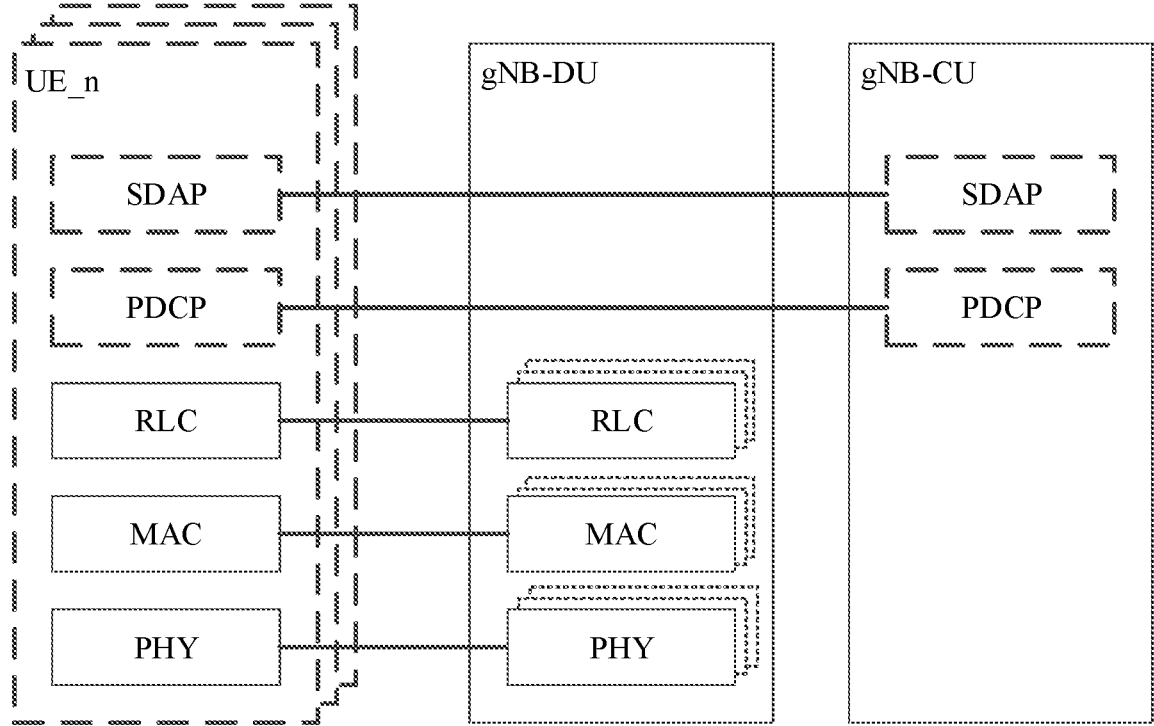
FIG. 5 is a second schematic diagram of a protocol stack architecture of a user plane in a CU-DU architecture according to an embodiment of this application.
Figure 6:
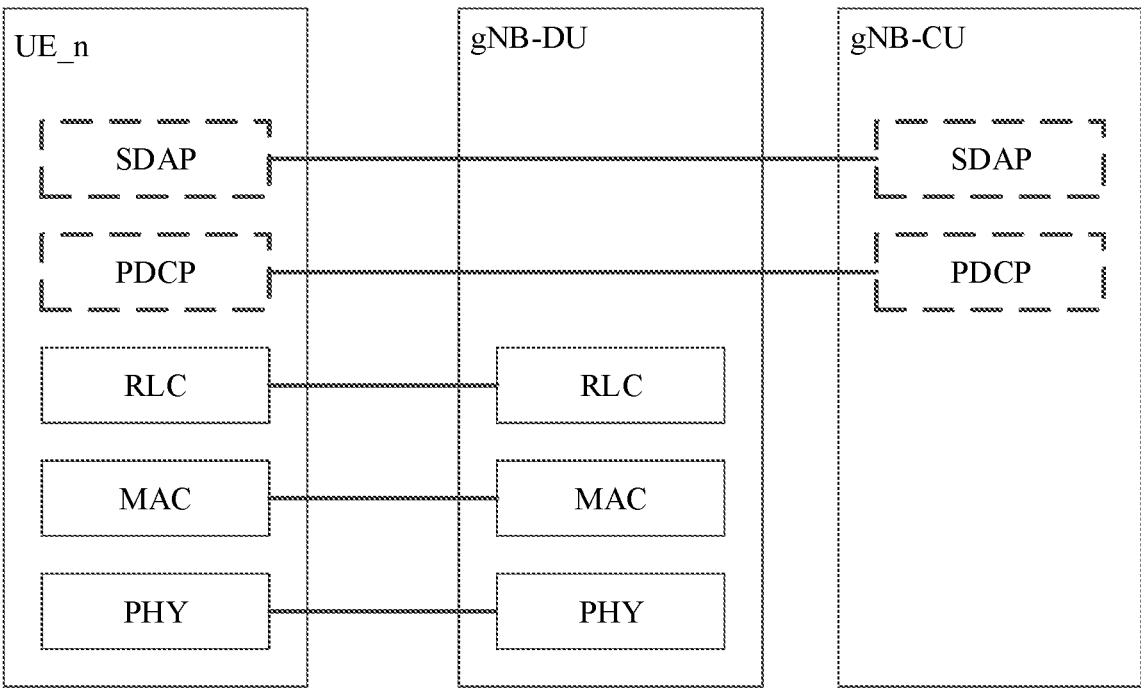
FIG. 6 is a third schematic diagram of a protocol stack architecture of a user plane in a CU-DU architecture according to an embodiment of this application.

Optionally, for a user plane of multicast traffic, if a PTP mode is used for transmission, an implementation of a protocol stack architecture may be shown in FIG. 5 or FIG. 6. Whether a PDCP entity is default may be determined based on a stipulation in a protocol or a configuration. Whether an SDAP entity is default may also be determined based on a stipulation in a protocol or a configuration. FIG. 5 is a schematic diagram of a protocol stack architecture in a PTP mode 1. FIG. 6 is a schematic diagram of a protocol stack architecture in a PTP mode 2.

It should be noted that main differences between protocol stack architectures corresponding to the PTM mode and the two PTP modes are as follows:

(1) PTM mode: On a base station side, regardless of a CU or a DU, for the same multicast traffic (for example, a temporary mobile group identity (TMGI) is used), the CU or the DU has only one set of user plane protocol entities. To be specific, one set of SDAP entity and PDCP entity is located in the CU, and one set of RLC entity, MAC entity, and PHY entity is located in the DU. However, corresponding SDAP entities, PDCP entities, RLC entities, MAC entities, and PHY entities may be established for different UE_n based on a configuration and/or whether there is interest. A plurality of UEs correspond to the same network-side protocol stack.

(2) PTP mode 1: On a base station side, for the same multicast traffic (for example, a TMGI identifier is used), a CU maintains one set of user plane protocol entities, and a DU needs to maintain different protocol stack entities for UEs. To be specific, the CU maintains only one set of SDAP entity and PDCP entity for the traffic, and the DU needs to establish one set of RLC entity, MAC entity, and PHY entity for each UE, corresponding to user plane protocol entities on the UE side. Because the multicast traffic is also transmitted in a unicast mode, the MAC entity and the PHY entity may be shared with existing unicast traffic entities of the UE. In addition, in the PTP mode, the UE needs to be in an RRC connected state. Therefore, the RLC entity, the MAC entity, and the PHY entity may be established and maintained between the UE and the DU by using a process similar to an existing unicast process. However, for the unified SDAP entity and the PDCP entity, when the CU establishes a PTP MRB or data radio bearer (DRB) for the UE (herein, a dedicated bearer for transmitting the multicast traffic is established, or optionally there is another bearer type, and content is the multicast traffic, but a bearer type may be similar to a DRB), the UE needs to be notified of current statuses of the SDAP entity and the PDCP entity, to facilitate establishment by the UE. Alternatively, status notification does not need to be performed by using RRC signaling; instead, the UE is notified that the unicast establishment is used for multicast, and the UE performs a special PDCP processing procedure. For example, a PDCP status variable is initialized to be calculated based on a serial number (SN) of the first received data packet.

(3) PTP mode 2: On a base station side, for the same multicast traffic (for example, a TMGI identifier is used), a CU and a DU each maintain one independent set of user plane protocol entities for each UE. To be specific, the CU establishes and maintains one set of SDAP entity and PDCP entity for each UE, and the DU also needs to establish and maintain one set of RLC entity, MAC entity, and PHY entity for each UE. Because the multicast traffic is also transmitted in a unicast mode, the MAC entity and the PHY entity may be shared with existing unicast traffic entities of the UE. In this case, because each UE has its own independent SDAP entity and/or PDCP entity, similar to that of unicast traffic, status initialization of the PDCP entity may start from 0, and correspondingly, the UE may initialize the PDCP entity and/or the SDAP entity in a manner similar to that of unicast bearer establishment.

In the embodiments of this application, the MBS traffic may also be referred to as multicast traffic or multimedia broadcast multicast traffic (MBMS) traffic.

Optionally, the PTM mode may also be referred to as a PTM sending mode or a PTM transmission mode.

Optionally, the PTP mode may also be referred to as a PTP sending mode or a PTP transmission mode.

Optionally, the control plane may also be referred to as a control surface.

Optionally, the user plane may also be referred to as a user surface.

It should be noted that, in the embodiments of this application, both the PTM mode and the PTP mode are a transmission mode of a Uu interface on a RAN side, that is, transmission between a base station and UE is point-to-multipoint and/or point-to-point transmission. Both the PTM and PTP transmission modes of the Uu interface are based on a multicast shared channel between a core network (CN) and a gNB. An entire channel from the CN to the gNB to the UE is in a unicast mode, and is similar to an existing unicast traffic, and an existing process may be reused. This is not considered in this application.

The following describes in detail an information control method provided in the embodiments of this application with reference to the accompanying drawings and by using specific embodiments and application scenarios thereof.

Figure 7:
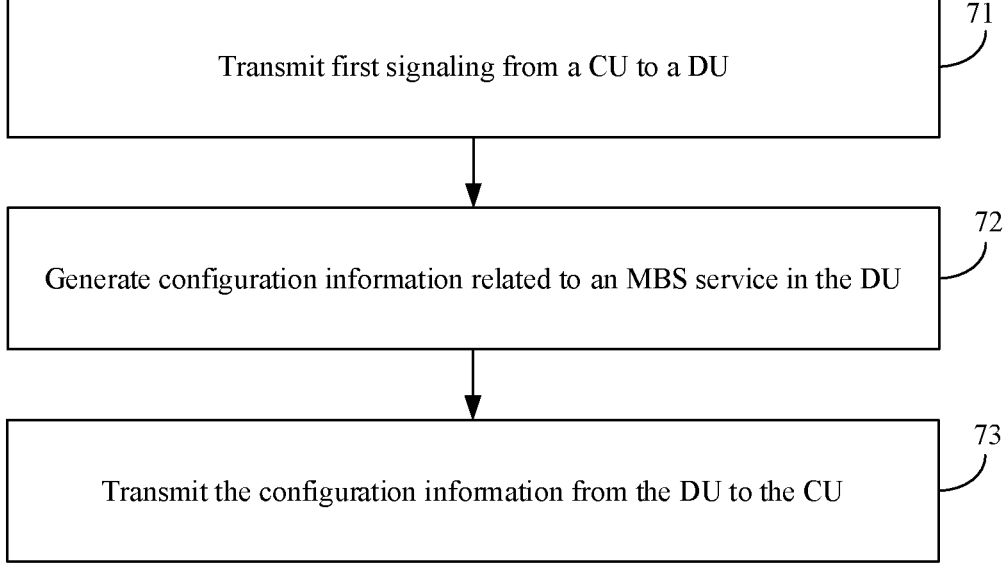
FIG. 7 is a flowchart of an information control method according to an embodiment of this application.

FIG. 7 is a flowchart of an information control method according to an embodiment of this application. The method is applied to a base station. The base station includes a CU and a DU. One standardized interface, for example, an F1 interface, is provided between the CU and the DU. Information exchange between the CU and the DU may be implemented through the interface. As shown in FIG. 7, the method includes the following steps.

Step 71: Transmit first signaling from the CU to the DU.

In this embodiment, the first signaling includes information about MBS traffic, and the information about MBS traffic is used to indicate that the DU transmits MBS traffic in a first mode. The information about MBS traffic includes but is not limited to a TMGI, cycle information, QoS information for the traffic, and the like. The QoS information for the traffic includes but is not limited to a bit rate, a block error rate, a delay, a priority, a traffic type, and the like.

Optionally, the first mode includes any one of the following: a PTM mode and a PTP mode.

For example, in a case that the first mode includes the PTM mode, the first signaling is F1 interface signaling, and any existing non-UE associated signaling, for example, gNB-CU configuration update signaling, between the CU and the DU may be reused. Alternatively, the first signaling is newly established F1 interface signaling, and is also non-UE associated signaling. For example, a name is gNB-CU MBS configuration signaling, especially used to carry an MBS related information establishment, modification, and/or release request; or a name is gNB-CU MBS configuration establishment signaling, used to establish MBS traffic; or a name is gNB-CU MBS configuration modification signaling, used to modify MBS traffic; or a name is gNB-CU MBS configuration release signaling, used to release MBS traffic. It can be understood that, in this case, transmission is performed in a multicast mode, and therefore the first signaling is not directly associated with any UE, that is, the first signaling is non-UE associated signaling.

For another example, in a case that the first mode includes the PTP mode, the first signaling is F1 interface signaling, and one piece of existing UE associated signaling, for example, UE context modification signaling, between the CU and the DU may be reused. Alternatively, the first signaling is newly established F1 interface signaling, and is also UE associated signaling. For example, a name is UE MBS configuration signaling, especially used to carry a UE and MBS related information establishment, modification, and/or release request; or a name is UE MBS configuration establishment signaling, used to establish MBS traffic; or a name is UE MBS configuration modification signaling, used to modify MBS traffic; or a name is UE MBS configuration release signaling, used to release MBS traffic.

Step 72: Generate configuration information related to the MBS traffic in the DU.

In this embodiment, after receiving the first signaling, the DU may learn that the MB S traffic is to be transmitted in the first mode, and reserve a resource required for the MBS traffic and generate a related configuration based on the information about MBS traffic.

Optionally, in the PTM mode, the configuration information related to the MBS traffic includes but is not limited to a configuration corresponding to RLC, a configuration corresponding to MAC, a PHY transmission related configuration, and the like. For example, the configuration corresponding to MAC includes a discontinuous reception (DRX) offset value, hybrid automatic repeat request (HARQ) enable/disable, a group radio network temporary identity (g-RNTI), a logical channel identity (LCID), and the like. For example, the PHY transmission related configuration includes a modulation and coding scheme (MCS) table, a transmission mode, and the like.

Optionally, in the PTP mode, the configuration information related to the MBS traffic includes but is not limited to an RLC configuration, a configuration corresponding to MAC, a PHY transmission related configuration, and the like. For example, the configuration corresponding to MAC includes HARQ disable/enable, an LCD, and the like. If a unicast transmission parameter also needs to be changed, for example, the PHY transmission related configuration includes an MCS table, a transmission mode, and the like.

Step 73: Transmit the configuration information from the DU to the CU.

In the information control method in this embodiment of this application, the first signaling may be transmitted from the CU to the DU, where the first signaling includes the information about MBS traffic, and the information about MBS traffic is used to indicate that the DU transmits MBS traffic in the first mode; the configuration information related to the MBS traffic is generated in the DU; and the configuration information is transmitted from the DU to the CU. In this way, after a CU-DU architecture is introduced into a base station, transmission of MBS traffic can be supported. Therefore, in a network with a CU-DU architecture, a terminal can also efficiently perform correct MBS traffic reception processing based on MBS traffic transmission parameter configured by the network, thereby further improving quality of service assurance of the traffic, and improving user experience and system efficiency.

In this embodiment of this application, in the PTM mode, transmission is performed on a cell and/or a frequency in each DU. For example, a cell 1 and/or a frequency 1 in a DU 1 need to perform transmission in the PTM mode, but other cells and frequencies do not; and a cell 5 and/or a frequency 2 in a DU 2 need to perform transmission in the PTM mode, but other cells and frequencies do not. The frequency 1 and the frequency 2 may be the same frequency or different frequencies. A specific cell/frequency selected for transmission may be determined by the CU. For example, a cell at a same frequency and with continuous coverage is preferentially used for transmission. This facilitates traffic continuity of UE, and the UE can achieve continuous multicast traffic reception provided that the UE moves at the frequency. Alternatively, selection may be performed by the DU. For example, a cell with sufficient resources or a cell suitable for PTM transmission is preferentially selected.

In the PTP mode, transmission is performed only at a Uu interface, and data from a CN to a gNB/gNB-CU is still in a multicast form. To be specific, a transmission tunnel from the CN to the gNB/gNB-CU is not associated with any UE, and the gNB determines to serve a small number of UEs in the PTP mode to improve transmission efficiency only because the count of users with interest is small. If transmission from the CN to the gNB/gNB-CU is also in a UE-specific unicast form, the case is the same as that of a conventional unicast traffic if the PTP mode is selected for an air interface.

It can be understood that a large number of UEs covered by a cell need to be incorporated in the PTM, and therefore the transmission mode is inefficient, for example, a transmission level is low, and an omnidirectional antenna is used. A benefit of the PTM lies in an advantage in resource consumption, because a plurality of UEs consume only one transmission resource. In the PTP mode, transmission is performed only for one UE, and transmission parameter adjustment, antenna beamforming, and the like may be performed only for the UE, and therefore transmission efficiency is high. However, in the PTP mode, each UE consumes one transmission resource, and therefore resource consumption is much higher than that in the PTM mode if there are a large number of UEs. Therefore, the number of UEs is one of significant indicators for selecting the PTP mode or the PTM mode.

Optionally, to enable the DU to reserve an appropriate resource for the MBS traffic, the first signaling may further include at least one of the following:

cell information and/or frequency information expected by the CU, for example, a cell identifier ID, a frequency ID, cell list information, and/or frequency list information;

cell type information and/or frequency type information expected by the CU, for example, the frequency type information includes a high frequency or a low frequency, an FR 1 or an FR2, or the like, and the cell type information includes a cell with a large coverage, a cell with a large capacity, a cell with resources as many as possible, or the like;

priority information about MBS traffic;

information about a comparison between priority of the MBS traffic and priority of unicast traffic;

information about whether the MBS traffic is able to be overridden by other MBS traffic and/or unicast traffic, for example, the MBS traffic is able to be overridden by other MBS traffic and/or unicast traffic, or the MBS traffic is unable to be overridden by other MBS traffic and/or unicast traffic; and information about whether the MBS traffic is able to override other MBS traffic and/or unicast traffic, for example, the MBS traffic is able to override other MBS traffic and/or unicast traffic, or the MBS traffic is unable to override other MBS traffic and/or unicast traffic.

In an implementation, the priority information about MBS traffic may be an actual priority of the MBS traffic. In this case, with reference to the information, included in the first signaling, about a comparison between priority of the MBS traffic and priority of unicast traffic, priorities of the MBS traffic and the unicast traffic may be compared.

In another implementation, the priority information about MB S traffic may be a priority, of unicast traffic, that corresponds to a converted priority of the MBS traffic. In this case, the priority of the MBS traffic may be directly compared with that of the unicast traffic by using the priority information about MBS traffic.

It can be understood that the priority of the MBS traffic and the priority of the unicast traffic may not be meanings in a same space. In conventional unicast, in a same priority space, a smaller priority value indicates a higher priority. However, the priority of the MBS traffic and the priority of the unicast traffic are independent sequences, and a smaller priority value does not necessarily mean a higher priority. For example, a priority 1 is not necessarily higher than a priority 3. Therefore, a specific additional configuration, for example, a comparison relationship between the priority of the MBS traffic and the priority of the unicast traffic, may be given, so that the MBS traffic can be compared with any other unicast traffic.

Optionally, the information about a comparison between priority of the MBS traffic and priority of unicast traffic may include at least one of the following:

the priority of the MBS traffic being higher than, lower than, or equal to the priority of the unicast traffic;

reporting information of a terminal about priority of MBS traffic and priority of unicast traffic, for example, the terminal considers that the MBS traffic has precedence, or the terminal considers that the unicast traffic has precedence, or the terminal considers that the MBS traffic has precedence over some unicast traffic such as Internet access traffic, but does not have precedence over some other unicast traffic such as phone traffic;

a priority threshold for MBS traffic;

a priority threshold for unicast traffic; and a priority threshold for MBS traffic and a priority threshold for unicast traffic.

For example, if only the priority threshold for the unicast traffic is present, unicast traffic whose priority value is lower than or equal to the threshold (a priority is higher) has precedence over all MBS traffic. The MBS traffic may have a higher priority than other unicast traffic that do not meet the threshold (that is, higher than the threshold).

Alternatively, if only the priority threshold for the unicast traffic is present, the MBS traffic may have precedence over unicast traffic whose priority value is higher than or equal to the threshold (a priority is lower), and all other unicast traffic that do not meet the threshold (that is, lower than the threshold) have precedence over the MBS traffic.

For another example, if only the priority threshold for the MBS traffic is present, MBS traffic whose priority value is lower than or equal to the threshold (a priority is higher) has precedence over all unicast traffic, and some unicast traffic may be excluded through stipulation in a protocol. The unicast traffic may have a higher priority than other MBS traffic that do not meet the threshold (that is, higher than the threshold).

Alternatively, if only the priority threshold for the MBS traffic is present, the unicast traffic may have precedence over MBS traffic whose priority value is higher than or equal to the threshold (a priority is lower), and all other MBS traffic that do not meet the threshold (that is, lower than the threshold) have precedence over the unicast traffic.

For another example, if both the priority threshold for the MBS traffic and the priority threshold for the unicast traffic are present, the following may be stipulated: The MBS traffic has precedence when a priority value of the MBS traffic is lower than or equal to a corresponding threshold (a priority is higher) and a priority value of the unicast traffic is higher than or equal to a corresponding threshold (a priority is lower); otherwise, the unicast traffic has precedence.

Alternatively, if both the priority threshold for the MBS traffic and the priority threshold for the unicast traffic are present, the following may be stipulated: The unicast traffic has precedence when a priority value of the unicast traffic is lower than or equal to a corresponding threshold (a priority is higher) and a priority value of the MBS traffic is higher than or equal to a corresponding threshold (a priority is lower); otherwise, the MBS traffic has precedence.

Optionally, in a case that the first mode is the PTM mode, the foregoing process of generating the configuration information related to the MBS traffic in the DU may include:

determining, by the DU, a target cell and/or a target frequency;

reserving, by the DU at the target cell and/or the target frequency, a resource required for the MBS traffic; and generating, by the DU based on the reserved resource, the configuration information related to the MBS traffic.

For example, the MBS traffic is usually periodic and has a specific requirement for a guaranteed bit rate. In this case, an appropriate periodic resource may be reserved for service transmission based on a corresponding cycle and rate, and a specific retransmission resource may be reserved according to a block error rate requirement of the service, for example, if the block error rate required is high, for example, less than $10^{-4}$, specific retransmission needs to be performed to ensure the block error rate requirement. Further, a periodic offset may be further selected for the periodic traffic based on a current situation of another traffic.

In this embodiment of this application, in a case that the first mode is the PTM mode, the DU may determine the target cell and/or the target frequency in different manners. This is separately described below.

(1) The first signaling includes the cell information expected by the CU, and the target cell is a cell, among cells corresponding to the cell information, that successfully performs acceptance; and/or the first signaling includes the frequency information expected by the CU, and the target frequency is a frequency, among frequencies corresponding to the frequency information, that successfully performs acceptance.

It can be understood that, when the CU has selected a cell and/or a frequency for transmitting the MBS traffic in the PTM mode, the first signaling may include the cell information and/or the frequency information expected by the CU. There may be more than one piece of cell information and/or frequency information, that is, there may be a plurality of pieces of cell information and/or frequency information. In this case, the DU may reserve and configure a resource only on a cell and/or a frequency expected by the CU. If the cell/frequency expected by the CU cannot perform acceptance, the DU returns acceptance failure information to the CU. If some cells/frequencies expected by the CU can successfully perform acceptance, the DU may return acceptance success information that includes detailed configuration information, and return acceptance failure information for a cell/frequency that fails to perform acceptance, where the acceptance failure information carries, for example, a cell ID/frequency ID of the cell/frequency that fails.

Optionally, in a case that the cells corresponding to the cell information expected by the CU include a cell that fails to perform acceptance, and/or the frequencies corresponding to the frequency information expected by the CU include a frequency that fails to perform acceptance, the DU may transmit acceptance failure information to the CU, where the acceptance failure information may include information about the cell that fails to perform acceptance, and/or information about the frequency that fails to perform acceptance.

(2) The target cell is a cell that successfully performs acceptance and that is selected by the DU from cells related to the DU; and/or the target frequency is a frequency that successfully performs acceptance and that is selected by the DU from frequencies related to the DU.

It can be understood that the CU may alternatively not determine a specific cell and/or frequency for transmitting the MBS traffic in the PTM mode. In this case, the DU may select one or more cells/frequencies based on resources, coverages, and other statuses of cells and frequencies managed by the DU, perform acceptance in the cells/frequencies, and return specific configuration information to the base station for a cell/frequency that successfully performs acceptance. In addition, because the CU does not specify a cell/frequency, acceptance failure information is returned to the CU only if no cell/frequency can perform acceptance; otherwise, acceptance failure information does not need to be returned provided that one cell/frequency can successfully perform acceptance.

(3) The first signaling includes the cell type information expected by the CU, and the target cell is a cell that successfully performs acceptance and that is selected by the DU based on the cell type information from cells related to the DU; and/or the first signaling includes the frequency type information expected by the CU, and the target frequency is a frequency that successfully performs acceptance and that is selected by the DU based on the frequency type information from frequencies related to the DU.

It can be understood that, when the CU has selected a cell type and/or a frequency type for transmitting the MBS traffic in the PTM mode, the first signaling may include the cell type information and/or the frequency type information expected by the CU. In this case, the DU may select a cell and/or a frequency based on the cell type information and/or the frequency type information, and reserve and configure a resource on the cell and/or the frequency.

It can be understood that the DU usually distinguishes acceptance in the PTP mode for single UE from acceptance in the PTM mode, because PTP transmission is clearer, and the DU has specific information about UE information such as a link status, and may estimate, based on the link status of the UE and the like, a size of a resource required for transmitting the MBS traffic when a given bit rate needs to be guaranteed. In the PTM mode, an inefficient link hypothesis is used. For example, normal reception needs to be guaranteed for UE at a cell edge. A resource size that is calculated in this way and that is required for achieving a guaranteed bit rate required for transmitting the MBS traffic may be different from that in unicast, and is usually greater than a unicast resource size.

In addition, for a PTP mode configuration for single UE, an existing status of the UE, for example, an existing bearer configuration, needs to be considered. An LCID for multicast traffic needs to be distinguished from an existing unicast LCID. An existing DRX cycle, offset, and the like are also changed based on characteristics of multicast traffic. With respect to cell information of the DU, because the UE is in a connected state, the DU clearly knows configurations of current serving cells of the UE. Usually, a DRB corresponding to the MBS traffic may be transmitted in any current serving cell. Certainly, the DU may alternatively further add a new serving cell for the UE based on resource and service statuses, to ensure good transmission and QoS assurance for both current unicast and new MBS traffic.

Optionally, after receiving the configuration information related to the MBS traffic from the DU, the CU may transmit target configuration information to the terminal by using any one of the following: broadcast RRC signaling, multicast RRC signaling, dedicated RRC signaling, or a system information block (SIB). The target configuration information includes the configuration information related to the MBS traffic, or the target configuration information includes updated configuration information related to the MBS traffic.

Optionally, the CU needs to perform a first operation before transmitting the first signaling to the DU. The first operation includes any one of the following:

determining to transmit the MBS traffic in the first mode; and determining to switch a transmission mode for the MBS traffic to the first mode.

Further, the CU may perform the first operation based on at least one of the following:

MBS traffic interest information collected by the CU;

a suggestion request of the DU;

MBS traffic measurement information reported by the DU; and auxiliary information or request information transmitted by a core network node, for example, the auxiliary information or the request information may be transmitted by using an NG interface signaling process.

That is, the determining, by the CU, to transmit the MBS traffic in the first mode or determining to switch a transmission mode for the MBS traffic to the first mode may be triggered by the CU, based on the suggestion request of the DU, or based on an indication or a request from the core network node.

Optionally, if triggering is performed by the CU, a collection manner for the MBS traffic interest information may include at least one of the following:

(1) The CU triggers the terminal to report the MBS traffic interest information. For example, when network-side resources are insufficient, learned MBS traffic interest information has expired, or the CU needs to collect interest information for a specific TMGI/TMGI list in another CU-based implementation, the CU may collect interest information for a related TMGI/TMGI list by using a signaling process, for example, broadcast signaling, multicast RRC signaling, or dedicated RRC signaling. The signaling carries a corresponding MBS traffic list that needs to be collected, for example, a TMGI list. After receiving information collection signaling from the network side, UE with interest reports MBS traffic interest information of the UE to the base station CU by using dedicated RRC, for decision-making by the base station CU.

(2) The terminal actively reports the MBS traffic interest information. For example, UE actively reports and updates MBS traffic interest or reception status. At least for UE in an RRC connected state, when a function switch for the MBS traffic interest or reception status is enabled on the network side, for example, the function switch may be an identifier in a SIB or an identifier in dedicated RRC signaling, and when the UE is interested in or is receiving the MBS traffic, the UE needs to report MBS traffic information list to the network in a timely manner; and in the case of an update, for example, a new service arrives, reception ends, interest is no longer shown, or new interest joins, the UE also reports the latest status in a timely manner, for example, a TMGI list. The network side may assess, based on a list of services that the UE is interested in, the number of UEs interested in the service, thereby facilitating decision-making by the CU.

Optionally, a trigger condition corresponding to the suggestion request of the DU may come from an aspect of resource occupation, an aspect of transmission efficiency, a terminal feedback status, or the like. The DU cannot determine to transmit the MBS traffic in the PTP/PTM mode or cannot determine to switch the transmission mode for the MBS traffic to the PTP/PTM mode, and therefore may suggest the CU to perform the operation. The trigger condition for the suggestion request of the DU may include but is not limited to at least one of the following:

(a) Usage of a target resource meets a first preset condition. The first preset condition may be preset according to an actual requirement. For example, the DU may provide a suggestion on PTP/PTM mode switching based on current resource usage. For example, if the current resources are abundant and cell resource load is quite low, the PTP mode may be recommended to achieve a better transmission effect; or if current resource occupation is quite high and cell resource load is quite high, the PTM mode may be recommended to reduce resources consumed by the MBS traffic.

(b) Transmission efficiency of a target resource meets a second preset condition. The second preset condition may be preset according to an actual requirement. For example, the DU may provide a suggestion on PTP/PTM mode switching based on current transmission efficiency. For example, if the DU finds that resource consumption of N PTP loads is much higher than PTM resource consumption, the DU may request the CU to switch to the PTM mode; or if PTM UE feeds back that transmission efficiency in the PTP mode is higher, the DU may request the CU to switch to the PTP mode.

(c) A feedback status of the terminal meets a third preset condition. The third preset condition may be preset according to an actual requirement. For example, the DU may provide a suggestion on PTP/PTM mode switching based on a feedback status of UE with interest. For example, the MBS traffic is configured to support a HARQ feedback. When no feedback is received or a few feedbacks are received at a feedback location, it may be considered that most UEs have left or are no longer interested, and the DU requests the CU to switch the mode. Alternatively, on the contrary, in PTP feedback detection, if it is considered that the PTM is more efficient, the DU requests the CU to switch the mode.

(d) Another suggestion request manner implemented by the DU.

In addition, the CU is a centralized control node, and may configure measurement information about the MBS traffic to the DU by using F1 interface signaling, for example, add an MB S measurement requirement to existing reporting configuration information, or configure MB S traffic measurement information by using new signaling, for example, an MBS resource status reporting indication.

Optionally, in this embodiment of this application, the CU may transmit second signaling to the DU, where the second signaling is used to configure the MBS traffic measurement information. Existing F1 interface signaling may be reused as the second signaling, or new signaling may be used.

Optionally, the MBS traffic measurement information may include at least one of the following:

(1) Total resource usage of MBS traffic in the PTM mode and/or the PTP mode.

(2) Resource usage of each MBS traffic in the PTM mode and/or the PTP mode.

(3) Resource usage of MBS traffic in a preset MBS traffic list in the PTM mode and/or the PTP mode.

Optionally, in the PTM mode, the resource usage in (1) to (3) may be the average number of periodic physical resource blocks (PRB) occupied, for example, the number of PRBs occupied by the MBS traffic in N milliseconds, subframes, slots, or other units, or the total number of PRBs. N is an average value for continuous assessment. For example, 0-N, N-2N, and 2N-3N each have a measurement value, and the average number of periodic PRBs occupied is obtained by using an arithmetic average value or a filtered average value. Alternatively, the resource usage may be the number of resources occupied in a specific periodic pattern. For example, measurement is performed in M units of every N milliseconds, subframes, slots, or other units, where N>M, and M is a DRX on stage of the service, that is, the MBS traffic is transmitted only within a range of M, and is not transmitted in other ranges. The number of PRBs occupied by the MBS traffic in the M units or the total number of PRBs is measured. Alternatively, arithmetic averaging, filtered averaging, or the like may be performed in a plurality of N cycles.

Optionally, in the PTP mode, the resource usage in (1) to (3) may be the average number of periodic PRBs occupied, for example, the number of PRBs, occupied by a DRB used for MBS transmission, in N milliseconds, subframes, slots, or other units, or the total number of PRBs. N is an average value for continuous assessment. For example, 0-N, N-2n, and 2N-3N each have a measurement value, and the average number of periodic PRBs occupied is obtained by using an arithmetic average value or a filtered average value. Alternatively, the resource usage may be the number of resources occupied in a specific periodic pattern. For example, measurement is performed in M units of every N milliseconds, subframes, slots, or other units, where N>M, and M is a DRX on stage of the MBS traffic, that is, the MBS traffic is transmitted only within a range of M, and is not transmitted in other ranges. The number of PRBs, occupied by a DRB used for MBS transmission, in the M units, or the total number of PRBs is measured. Alternatively, arithmetic averaging, filtered averaging, or the like may be performed in a plurality of N cycles.

(4) Total resource usage of MBS traffic in the PTP mode for each or a given terminal.

(5) Resource usage of each MBS traffic in the PTP mode for each or a given terminal.

(6) Resource usage of MBS traffic in a preset MBS traffic list in the PTP mode for each or a given terminal.

(7) Feedback information for MBS traffic in the PTM mode.

For example, if a feedback, such as a HARQ feedback, is enabled for MBS traffic transmitted in the PTM mode, HARQ feedback related information such as a HARQ correctness rate, a retransmission probability, and link quality information of the worst terminal may be collected.

(8) For MBS traffic in the PTP mode, terminal information that is specified or meets a fourth preset condition and that is configured to be reported.

For example, the terminal information is link quality information.

(9) Total number of active terminals for MBS traffic in the PTM mode.

(10) Number of active terminals for each MBS traffic in the PTM mode.

(11) Number of active terminals for given MBS traffic in the PTM mode.

(12) Number of active terminals for MBS traffic in a preset MBS traffic list in the PTM mode.

Optionally, the number in (9) to (12) may be a specific value, or a reported indication of being higher than a threshold or lower than a threshold. Usually, the number of UEs may be determined based on a HARQ feedback.

(13) Hardware load of the PTM mode and/or the PTP mode.

Optionally, the hardware load of (13) may be determined based on all MBS traffic, or determined based on each MBS traffic, or determined based on a preset MBS traffic list.

(14) Remaining capacity of the PTM mode and/or the PTP mode.

Optionally, the remaining capacity in (14) may be determined based on all MBS traffic, or determined based on each MBS traffic, or determined based on a preset MBS traffic list.

It should be noted that all of the measurement information in (1) to (14) may be configured to be periodically reported or reported upon triggering by an event. When a reporting condition is met, the DU reports corresponding measurement information to the CU, so that the CU determines or switches the PTP/PTM mode.

In this embodiment of this application, a UE-related process, for example, an RRC process of UE, mainly includes generation and transmission of broadcast, multicast, or dedicated RRC signaling. A generation process is described above. Some information, for example, configurations at an RLC layer and lower layers, may be generated by the DU and transmitted to the CU. The CU combines the information with a part of information generated by the CU, for example, configurations at a PDCP layer and upper layers, to form RRC signaling, and transmits the RRC signaling to the UE through an air interface of the DU. Typical processes include an MBS PTM/PTP signaling configuration process, triggering of MBS traffic interest information collection and counting, and the like. In an uplink reporting process of the UE, for example, MBS counting response or MBS interest indication may be transmitted by using a UL unicast SRB 1. Transmission of this part of information between the DU and the CU is the same as that of a conventional Uu SRB.

The following describes this application in detail with reference to Example 1 to Example 3.

Example 1

In Example 1, how to establish a PTM transmission mode for MBS traffic on a base station side is described in detail. A prerequisite is as follows: A CU has determined from a service interest information collection result of a core network or the CU that MBS traffic needs to be transmitted in a PTM mode. For example, the collection result is that the number of terminals with interest is greater than a specific threshold. A corresponding establishment process may include the following steps.

Step 1: The CU transmits F1 interface signaling (namely, first signaling) to a DU, where the signaling includes information about MBS traffic, and is used to notify the DU that the MBS traffic is to be transmitted in a PTM mode.

Optionally, for information included in the F1 interface signaling and the information about MBS traffic, refer to the foregoing content. Details are not described herein again.

Step 2: After receiving the F1 interface signaling, the DU learns that MBS traffic needs to be transmitted in a PTM mode; determines a target cell and/or a target frequency based on the information about MBS traffic; reserves, at the target cell and/or the target frequency, a resource required for the MBS traffic; and generates corresponding configuration information.

Step 3: The DU returns, to the CU, a list of cells that successfully perform acceptance and corresponding configuration information.

Optionally, while returning the list of the cells that successfully perform acceptance and the corresponding configuration information, the DU may establish related MRB bearers, for example, a corresponding RLC entity, in these cells based on the configuration information, to prepare for subsequent multicast transmission of the MBS traffic.

Step 4: After receiving the configuration information fed back by the DU, the CU learns of specific configuration information in the cells that successfully perform acceptance, organizes the configuration information into broadcast signaling, multicast RRC signaling, or unicast RRC signaling, and transmits the signaling to UE by using the DU, so that the UE interested in the service can obtain configuration information and scheduling information of the service.

Step 5: When the service starts, the CU transmits, by using an established PTM configuration channel, a related MBS traffic to a cell, of the DU, that belongs to PTM transmission.

Step 6: After receiving the MBS traffic, the DU schedules a resource for data of the MBS traffic based on a configured cycle and offset and by using a configured g-RNTI, and transmits a data packet of the service on the scheduled resource.

It should be noted that, if the UE receives configuration information about MBS traffic, the UE may establish a corresponding MRB bearer based on content in the configuration information, where the MRB bearer may include an SDAP entity, a PDCP entity, and/or an RLC entity. A MAC entity may perform corresponding MBS PTM reception by performing scheduling and data decoding and reception at a specific cycle location by using a related cycle configuration and a configured g-RNTI.

Example 2

In Example 2, how to establish a PTP transmission mode for MBS traffic on a base station side is described in detail. A prerequisite is as follows: A CU has determined from a service interest information collection result of the CU that MBS traffic needs to be transmitted in a PTP mode for specific UE. For example, the collection result is that the number of terminals with interest is less than a specific threshold. A corresponding establishment process may include the following steps.

Step 1: The CU transmits F1 interface signaling (namely, first signaling) to a DU, where the signaling is UE associated signaling, includes information about MBS traffic, and is used to notify the DU that the MBS traffic is to be transmitted in a PTP mode.

Optionally, for information included in the F1 interface signaling and the information about MBS traffic, refer to the foregoing content. Details are not described herein again. It should be noted that, because transmission is performed in a unicast mode, one priority that can be directly compared with that of unicast traffic may be assigned to the MBS traffic transmitted in the PTP mode, to perform comparison with another unicast traffic.

Step 2: After receiving the F1 interface signaling, the DU learns that MBS traffic needs to be transmitted for the UE in a PTP mode; reserves, based on the information about the MBS traffic, a resource required for the service; and generates corresponding configuration information.

Step 3: The DU returns acceptance and configuration information of the UE to the CU. If acceptance succeeds, the configuration information is returned; otherwise, acceptance failure information is returned.

Optionally, the DU may establish a corresponding RLC bearer, for example, an RLC entity, for the UE while returning the acceptance and configuration information of the UE to the CU, and wait for subsequent arrival of the MBS traffic and perform transmission.

Step 4: After receiving the configuration information fed back by the DU, the CU learns of specific PTP configuration information for the UE, organizes the configuration information into dedicated RRC signaling, and transmits the signaling to the UE by using the DU, so that the UE can obtain configuration information and scheduling information of the service.

Step 5: When the service starts or a data packet arrives, the CU transmits, to the DU by using an established PTP configuration channel, MBS traffic related to the UE.

Step 6: After receiving MBS traffic packet, the DU schedules a resource for data of the service based on a configured cycle and offset and by using a C-CNTI of the UE, and transmits a data packet of the service on the scheduled resource.

It should be noted that, if the UE receives RRC reconfiguration information of a DRB (for example, carrying a TMGI or another identifier) corresponding to the MBS traffic, the UE may establish a corresponding DRB bearer based on content in the reconfiguration information, where the DRB bearer may include an SDAP entity, a PDCP entity, and/or an RLC entity. A MAC entity may perform corresponding MBS PTP reception by performing scheduling and data decoding and reception at a specific cycle location by using a related cycle configuration and the C-RNTI.

Example 3

In Example 3, when a CU determines to perform PTP/PTM mode switching, a specific process may include the following steps.

Step 1: The CU transmits a resource and configuration request for a target mode to a DU. For example, in the case of switching to a PTM mode, one non-UE associated signaling (namely, first signaling) process is used to establish the MBS PTM mode, as described in Example 1; or in the case of switching to a PTP mode, one UE associated signaling (namely, first signaling) process is used to establish the MBS PTP mode, as described in Example 2.

Step 2: The DU receives the request, performs acceptance, generates configuration information, and returns the configuration information to the CU. This is similar to the process in Example 1 or Example 2.

Particularly, if the mode switching request is a request triggered by the DU to the CU, when triggering the request, the DU may also add an acceptance result and a configuration for the target mode to the CU, thereby preventing the CU from requesting acceptance and configuration from the DU again, and reducing a delay. Details are as follows:

(1) If the target mode is the PTM mode, because a related QoS requirement is also transmitted to the DU during PTP establishment for MBS traffic, the PTM and the PTP do not affect the QoS requirement, or an affecting manner is known to the DU (stipulated in a protocol or configured by the CU), and the DU may directly perform acceptance and generate a configuration according to the QoS requirement.

(2) If the target mode is the PTP mode, the DU may generate, based on a UE activation status known to the DU, a PTP configuration corresponding to UE; or provide a recommended universal configuration without specifying specific UE, and provide the number of UEs that can be accepted.

Optionally, after the CU receives the acceptance and configuration result for the target mode in the foregoing process of requesting the DU or actively triggering reporting by the DU, the CU may determine to switch the mode, organize an RRC message, and transmit the message to the UE by using broadcast, multicast, or dedicated signaling. After receiving the switching message, the UE performs service reception in a new mode.

It can be understood that the foregoing embodiment basically describes a control plane process, and the following describes a user plane process, which is mainly establishment and maintenance of an F1-U (F1 interface user plane) tunnel.

Optionally, the first mode is the PTM mode, that is, MBS traffic transmission mode configured between the CU and the DU is the PTM mode, and the CU corresponds to a plurality of DUs. In this case, one user plane tunnel may be established between the CU and each DU; or one user plane multicast tunnel may be established between the CU and the plurality of DUs.

For example, the MBS traffic transmission mode configured between the CU and the DU is the PTM mode. This is equivalent to that a plurality of cells of one DU or cells of a plurality of DUs corresponding to one CU transmit the same service data. In this case, one TMGI tunnel may be established between the CU and each involved DU. For example, when N DUs are involved, there are equivalently N channels, for example, a GTP-U tunnel, used to transmit the MBS traffic from the CU to the DU. Alternatively, one multicast TMGI tunnel may be established between the CU and each involved DU. For example, when N DUs are involved, this is also one tunnel. A specific multicast address may be used for the multicast TMGI tunnel. For example, a multicast IP address or a multicast transport network layer (TNL) address is used for identification. After the DU joins multicast, the DU listens to data at the corresponding multicast address.

Optionally, the first mode is the PTP mode (corresponding to the foregoing PTP mode 1), the CU corresponds to a plurality of DUs, the CU maintains a unified first user plane entity, for example, an SDAP entity and a PDCP entity, for terminals, and the plurality of DUs each maintain a second user plane entity, for example, an RLC entity, a MAC entity, and a PHY entity, for each terminal. In this case, one user plane tunnel may be established between the CU and each DU; or one user plane multicast tunnel may be established between the CU and the plurality of DUs.

For example, the MBS traffic transmission mode configured between the CU and the DU is the foregoing PTP mode 1. As shown in FIG. 5, in this case, one TMGI tunnel may be established between the CU and each involved DU. For example, when N DUs are involved, there are equivalently N channels, for example, a GTP-U tunnel, used to transmit the MBS traffic from the CU to the DU. Alternatively, one multicast TMGI tunnel may be established between the CU and each involved DU. For example, when N DUs are involved, this is also one tunnel. A specific multicast address may be used for the multicast TMGI tunnel. For example, a multicast IP address or a multicast TNL address is used for identification. After the DU joins multicast, the DU listens to data at the corresponding multicast address.

Optionally, the first mode is the PTP mode (corresponding to the foregoing PTP mode 2), and the CU and the DU maintain a unified first user plane entity and a unified second user plane entity for each terminal. For example, the first user plane entity is an SDAP entity and a PDCP entity, and the second user plane entity is an RLC entity, a MAC entity, and a PHY entity. In this case, a separate user plane tunnel may be established between the CU and the DU for each terminal; or a distinguishable user plane multicast tunnel may be established between the CU and the DU for each terminal.

For example, the MBS traffic transmission mode configured between the CU and the DU is the foregoing PTP mode 2. As shown in FIG. 6, a tunnel for each terminal (per UE) is established between the CU and the DU. In this case, an independent or distinguishable tunnel needs to be established for a PTP service of each UE. The independent tunnel means that a separate GTP-U tunnel with a separate ID is established for an MBS PTP service corresponding to a specific TMGI. For example, a tunnel endpoint identifier (TED) is used for distinguishing. After an independent tunnel is established between the CU and the DU for each UE, service data corresponding to a specified TMGI of the corresponding UE is transmitted in the tunnel. The distinguishable tunnel means that one tunnel may be shared with other MBS PTP services. However, an internal stream, for example, a header of a GTP-U, carries a TMGI identifier to distinguish between different MBS traffic. A unicast tunnel of corresponding UE may even be reused. However, MBS traffic also needs to be clearly indicated, and a specific TMGI is carried to distinguish between different services.

It can be understood that, after the F1-U tunnel is established and maintained clearly, the DU transmits received PTM data on an air interface in the PTM mode based on a configuration, and transmits PTP data on the air interface in a unicast mode.

It should be noted that the information control method provided in the embodiments of this application may be performed by an information control apparatus, or by a control module that is in the information control apparatus and that is configured to perform the information control method. In the embodiments of this application, an information control apparatus provided in the embodiments of this application is described by using an example in which the information control apparatus performs the information control method.

Figure 8:
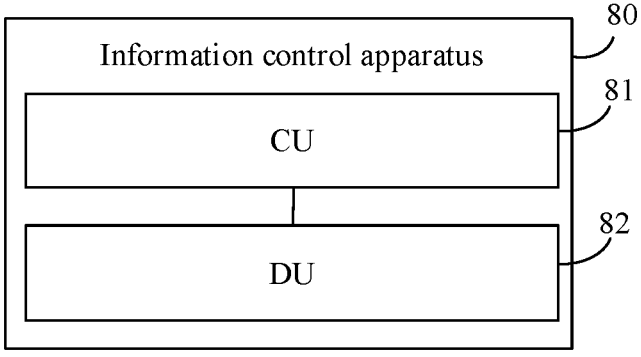
FIG. 8 is a schematic structural diagram of an information control apparatus according to an embodiment of this application.

FIG. 8 is a schematic structural diagram of an information control apparatus according to an embodiment of this application. The information control apparatus is applied to a base station. As shown in FIG. 8, the information control apparatus 80 includes a CU 81 and a DU 82.

Optionally, the CU 81 is configured to transmit first signaling to the DU 82, where the first signaling includes information about MBS traffic, and the information about MBS traffic is used to indicate that the DU 82 transmit MBS traffic in a first mode; and the DU 82 is configured to generate configuration information related to the MBS traffic, and transmit the configuration information to the CU 81.

Optionally, the first mode includes any one of the following: a PTM mode and a PTP mode.

Optionally, the first signaling further includes at least one of the following:

cell information and/or frequency information expected by the CU;

cell type information and/or frequency type information expected by the CU;

priority information about MBS traffic;

information about a comparison between priority of the MBS traffic and priority of unicast traffic;

information about whether the MBS traffic is able to be overridden by other MBS traffic and/or unicast traffic; and information about whether the MBS traffic is able to override other MBS traffic and/or unicast traffic.

Optionally, the information about a comparison between priority of the MBS traffic and priority of unicast traffic includes at least one of the following:

the priority of the MBS traffic being higher than, lower than, or equal to the priority of the unicast traffic;

reporting information of a terminal about priority of MBS traffic and priority of unicast traffic;

a priority threshold for MBS traffic;

a priority threshold for unicast traffic; and a priority threshold for MBS traffic and a priority threshold for unicast traffic.

Optionally, the first mode is the PTM mode, and the DU 82 includes:

a determining module, configured to determine a target cell and/or a target frequency;

a reservation module, configured to reserve, at the target cell and/or the target frequency, a resource required for the MBS traffic; and a generation module, configured to generate, based on the reserved resource, the configuration information related to the MB S traffic.

Optionally, the first signaling includes the cell information expected by the CU, and the target cell is a cell, among cells corresponding to the cell information, that successfully performs acceptance; and/or the first signaling includes the frequency information expected by the CU, and the target frequency is a frequency, among frequencies corresponding to the frequency information, that successfully performs acceptance.

Optionally, in a case that the cells corresponding to the cell information include a cell that fails to perform acceptance, and/or the frequencies corresponding to the frequency information include a frequency that fails to perform acceptance, the DU 82 is further configured to transmit acceptance failure information to the CU 81, where the acceptance failure information includes information about the cell that fails to perform acceptance, and/or information about the frequency that fails to perform acceptance.

Optionally, the target cell is a cell that successfully performs acceptance and that is selected by the DU from cells related to the DU; and/or the target frequency is a frequency that successfully performs acceptance and that is selected by the DU from frequencies related to the DU.

Optionally, the first signaling includes the cell type information expected by the CU, and the target cell is a cell that successfully performs acceptance and that is selected by the DU based on the cell type information from cells related to the DU; and/or the first signaling includes the frequency type information expected by the CU, and the target frequency is a frequency that successfully performs acceptance and that is selected by the DU based on the frequency type information from frequencies related to the DU.

Optionally, the CU 81 is further configured to:

transmit target configuration information to a terminal by using any one of the following:

broadcast RRC signaling, multicast RRC signaling, dedicated RRC signaling, and a SIB, where the target configuration information includes the configuration information related to the MBS traffic, or the target configuration information includes updated configuration information related to the MBS traffic.

Optionally, the CU 81 is further configured to perform a first operation, where the first operation includes any one of the following:

determining to transmit the MBS traffic in the first mode; and determining to switch a transmission mode of the MBS traffic to the first mode.

Optionally, the CU 81 is further configured to perform the first operation based on at least one of the following:

MBS traffic interest information collected by the CU;

a suggestion request of the DU;

MBS traffic measurement information reported by the DU; and auxiliary information or request information transmitted by a core network node.

Optionally, a collection manner for the MBS traffic interest information includes at least one of the following:

the CU triggers the terminal to report the MBS traffic interest information; and the terminal actively reports the MBS traffic interest information.

Optionally, a trigger condition for the suggestion request of the DU includes at least one of the following:

usage of a target resource meets a first preset condition;

transmission efficiency of a target resource meets a second preset condition; and a feedback status of the terminal meets a third preset condition.

Optionally, the CU 81 is further configured to transmit second signaling to the DU, where the second signaling is used to configure the MBS traffic measurement information.

Optionally, the MBS traffic measurement information includes at least one of the following:

total resource occupancy of MB S traffic in the PTM mode and/or the PTP mode;

resource occupancy of each MBS traffic in the PTM mode and/or the PTP mode;

resource occupancy of MBS traffic in a preset MBS traffic list in the PTM mode and/or the PTP mode;

total resource occupancy of MBS traffic in the PTP mode for each or a given terminal;

resource occupancy of each MBS traffic in the PTP mode for each or a given terminal;

resource occupancy of MBS traffic in a preset MBS traffic list in the PTP mode for each or a given terminal;

feedback information for MBS traffic in the PTM mode;

for MBS traffic in the PTP mode, terminal information that is specified or meets a fourth preset condition and that is configured to be reported;

total number of active terminals for MBS traffic in the PTM mode;

number of active terminals for each MBS traffic in the PTM mode;

number of active terminals for given MBS traffic in the PTM mode;

number of active terminals for MBS traffic in a preset MBS traffic list in the PTM mode;

hardware load of the PTM mode and/or the PTP mode; and remaining capacity of the PTM mode and/or the PTP mode.

Optionally, the first mode is the PTM mode, the CU 81 corresponds to a plurality of DUs 82, and the CU 81 is further configured to perform any one of the following:

establishing one user plane tunnel between the CU 81 and each DU 82; and establishing one user plane multicast tunnel between the CU 81 and the plurality of DUs 82.

Optionally, the first mode is the PTP mode, the CU 81 corresponds to a plurality of DUs 82, and when the CU 81 maintains a unified first user plane entity for the terminal and the plurality of DUs 82 each maintain a second user plane entity for each terminal, the CU 81 is further configured to perform any one of the following:

establishing one user plane tunnel between the CU 81 and each DU 82; and establishing one user plane multicast tunnel between the CU 81 and the plurality of DUs 82.

Optionally, the first mode is the PTP mode, the CU 81 and the DU 82 maintain a unified first user plane entity and a unified second user plane entity for each terminal, and the CU 81 is further configured to perform any one of the following:

establishing a separate user plane tunnel between the CU 81 and the DU 82 for each terminal; and establishing a distinguishable user plane multicast tunnel between the CU 81 and the DU 82 for each terminal.

The information control apparatus 80 provided in this embodiment of this application is capable of implementing the processes implemented in the method embodiment shown in FIG. 7, with the same technical effects achieved. To avoid repetition, details are not described herein again.

Figure 9:
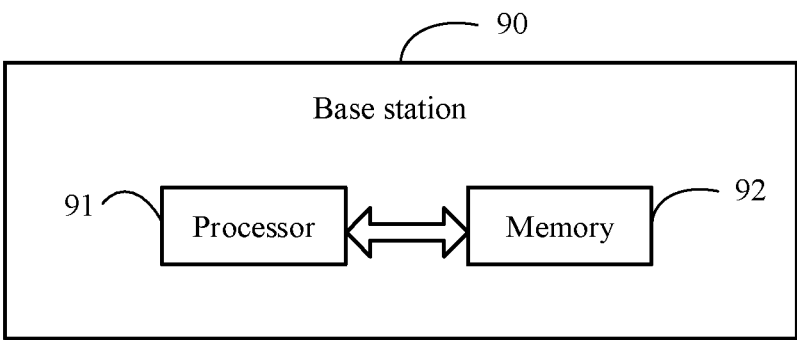
FIG. 9 is a schematic structural diagram of a base station according to an embodiment of this application.

Optionally, as shown in FIG. 9, an embodiment of this application further provides a base station 90, including a processor 91, a memory 92, and a program or instructions stored in the memory 92 and capable of running on the processor 91. When the program or instructions are executed by the processor 91, the processes of the method embodiment shown in FIG. 7 are implemented, with the same technical effects achieved. To avoid repetition, details are not described herein again.

Figure 10:
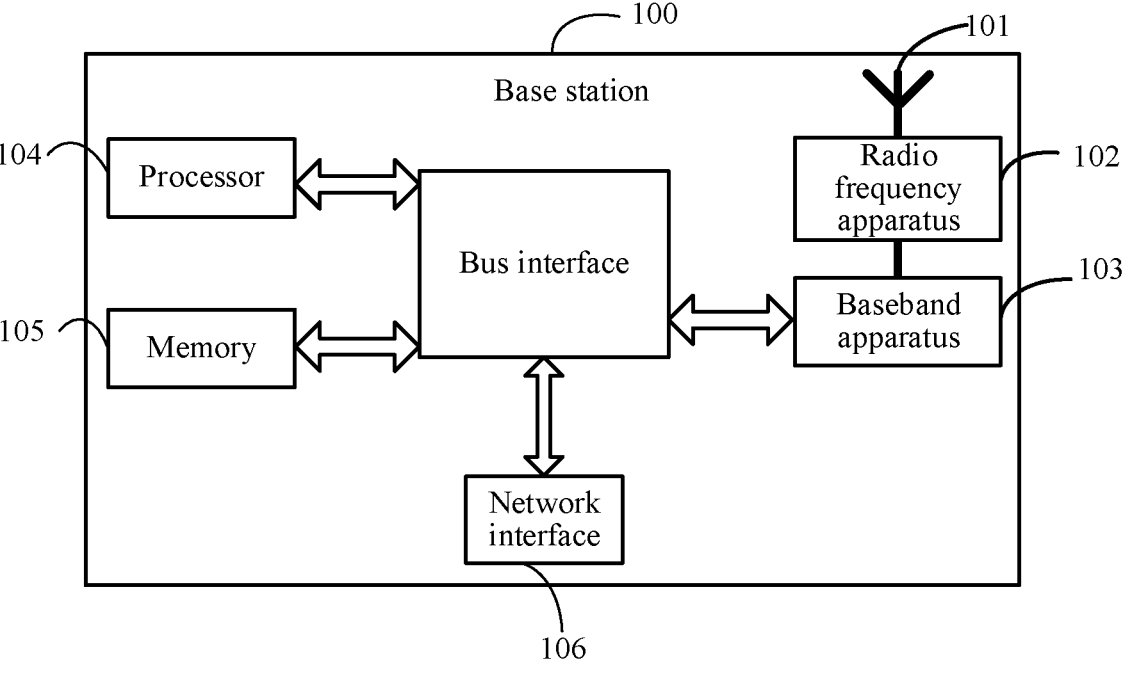
FIG. 10 is a schematic structural diagram of another base station according to an embodiment of this application.

Optionally, an embodiment of this application further provides a base station 100. As shown in FIG. 10, the base station 100 includes an antenna 101, a radio frequency apparatus 102, and a baseband apparatus 103. The antenna 101 is connected to the radio frequency apparatus 102. In an uplink direction, the radio frequency apparatus 102 receives information by using the antenna 101, and sends the received information to the baseband apparatus 103 for processing. In a downlink direction, the baseband apparatus 103 processes to-be-sent information, and sends the information to the radio frequency apparatus 102; and the radio frequency apparatus 102 processes the received information and then sends the information by using the antenna 101.

The baseband apparatus 103 may include, for example, at least one baseband processing unit, where a plurality of chips are disposed on the baseband processing unit. As shown in FIG. 10, one of the chips is, for example, the processor 104, and connected to the memory 105, to invoke the program in the memory 105 to perform the operations of the network device shown in the foregoing method embodiment.

The baseband apparatus 103 may further include a network interface 106, configured to exchange information with the radio frequency apparatus 102, where the interface is, for example, a common public radio interface (CPRI for short).

Specifically, the base station 100 in this embodiment of this application uses a CU-DU architecture, and further includes instructions or a program stored in the memory 105 and capable of running on the processor 104, and the processor 104 invokes the instructions or program in the memory 105 to perform the method shown in FIG. 7, with the same technical effects achieved. To avoid repetition, details are not described herein again.

An embodiment of this application further provides a readable storage medium. The readable storage medium stores a program or instructions. When the program or instructions are executed by a processor, the processes of the method embodiment shown in FIG. 7 are implemented, with the same technical effects achieved. To avoid repetition, details are not described herein again.

The processor is a processor in the base station in the foregoing embodiments. The readable storage medium includes a computer-readable storage medium, for example, a computer read-only memory (ROM), a random access memory (RAM), a magnetic disk, or an optical disc.

An embodiment of this application further provides a chip. The chip includes a processor and a communications interface. The communications interface is coupled to the processor. The processor is configured to run a program or instructions for a network-side device, to implement the processes of the method embodiment shown in FIG. 7, with the same technical effects achieved. To avoid repetition, details are not described herein again.

It should be understood that the chip mentioned in this embodiment of this application may also be referred to as a system-level chip, a system chip, a chip system, a system-on-a-chip, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element preceded by the statement "includes a . . . " does not preclude the existence of other identical elements in the process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, a person skilled in the art may clearly understand that the method in the foregoing embodiments may be implemented by software with a necessary general hardware platform. Certainly, the method in the foregoing embodiments may alternatively be implemented by hardware. However, in many cases, the former is a preferred implementation. Based on such an understanding, the technical solutions of this application essentially or a part thereof that contributes to the prior art may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

It should be understood that division of modules of the device is merely logical function division. The modules may be all or partially integrated in a physical entity or may be physically separate in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, the modules may be all or partially integrated, or may be implemented independently. Herein, the processing component may be an integrated circuit, and has a signal processing capability. In an implementation process, the steps of the foregoing method or the foregoing modules may be implemented by using an integrated logical circuit of hardware in the processor component or by using instructions in a form of software.

For example, the modules, units, sub-units, or sub-modules may be one or more integrated circuits configured to implement the foregoing method, for example, one or more application-specific integrated circuits (ASIC), or one or more microprocessors (digital signal processor, DSP), or one or more field programmable gate arrays (FPGA). For another example, when one of the foregoing modules is implemented in a form of program code invoked by a processing component, the processing component may be a general-purpose processor, for example, a central processing unit (CPU) or another processor capable of invoking program code. For another example, the modules may be integrated in a form of a system-on-a-chip (SOC) for implementation.

The foregoing describes the embodiments of this application with reference to the accompanying drawings. However, this application is not limited to the foregoing specific implementations. The foregoing specific implementations are merely illustrative rather than restrictive. As instructed by this application, a person of ordinary skill in the art may develop many other manners without departing from the essence of this application and the protection scope of the claims, and all such manners shall fall within the protection scope of this application.

What is claimed is:

1. An information control method, applied to a base station, wherein the base station comprises a central unit CU and a distributed unit DU, and the method comprises:
transmitting information about multicast broadcast service MBS traffic from the CU to the DU, wherein the information about MBS traffic is used to indicate that the DU transmits MBS traffic in a first mode;
generating configuration information related to the MBS traffic in the DU; and
transmitting the configuration information from the DU to the CU;
wherein the CU further transmits any one of the following:
information about whether the MBS traffic is able to be overridden by other MBS traffic and/or unicast traffic; and
information about whether the MBS traffic is able to override other MBS traffic and/or unicast traffic.

2. The method according to claim 1, wherein the first mode comprises any one of the following: a point-to-multipoint PTM mode and a point-to-point PTP mode.

3. The method according to claim 2, wherein the first mode is the PTM mode, and the generating configuration information related to the MBS traffic in the DU comprises:
determining, by the DU, a target cell and/or a target frequency;
reserving, by the DU at the target cell and/or the target frequency, a resource required for the MBS traffic; and
generating, by the DU based on the reserved resource, the configuration information related to the MBS traffic.

4. The method according to claim 3, wherein the CU further transmits cell information expected by the CU, and the target cell is a cell, among cells corresponding to the cell information, that successfully performs acceptance; and/or
the CU further transmits frequency information expected by the CU, and the target frequency is a frequency, among frequencies corresponding to the frequency information, that successfully performs acceptance.

5. The method according to claim 4, wherein the cells corresponding to the cell information comprise a cell that fails to perform acceptance, and/or the frequencies corresponding to the frequency information comprise a frequency that fails to perform acceptance, and the method further comprises:
transmitting acceptance failure information from the DU to the CU, wherein the acceptance failure information comprises information about the cell that fails to perform acceptance, and/or information about the frequency that fails to perform acceptance.

6. The method according to claim 3, wherein the target cell is a cell that successfully performs acceptance and that is selected by the DU from cells related to the DU; and/or
the target frequency is a frequency that successfully performs acceptance and that is selected by the DU from frequencies related to the DU.

7. The method according to claim 6, wherein the CU further transmits cell type information expected by the CU, and the target cell is a cell that successfully performs acceptance and that is selected by the DU based on the cell type information from cells related to the DU; and/or
the CU further transmits frequency type information expected by the CU, and the target frequency is a frequency that successfully performs acceptance and that is selected by the DU based on the frequency type information from frequencies related to the DU.

8. The method according to claim 2, wherein the first mode is the PTM mode, the CU corresponds to a plurality of DUs, and the method further comprises any one of the following:
establishing one user plane tunnel between the CU and each DU; and
establishing one user plane multicast tunnel between the CU and the plurality of DUs.

9. The method according to claim 2, wherein the first mode is the PTP mode, the CU corresponds to a plurality of DUs, the CU maintains a unified first user plane entity for terminals and the plurality of DUs each maintain a second user plane entity for each terminal, the method further comprises any one of the following:
establishing one user plane tunnel between the CU and each of the DUs; and
establishing one user plane multicast tunnel between the CU and the plurality of DUs.

10. The method according to claim 2, wherein the first mode is the PTP mode, the CU and the DU maintain a unified first user plane entity and a unified second user plane entity for each terminal, and the method further comprises any one of the following:
establishing a separate user plane tunnel between the CU and the DU for each terminal; and
establishing a distinguishable user plane multicast tunnel between the CU and the DU for each terminal.

11. The method according to claim 1, wherein the CU further transmits at least one of the following:
priority information about MBS traffic;
cell information and/or frequency information expected by the CU;
cell type information and/or frequency type information expected by the CU; and
information about comparison between priority of MBS traffic and priority of unicast traffic.

12. The method according to claim 11, wherein the information about comparison between priority of MBS traffic and priority of unicast traffic comprises at least one of the following:
the priority of MBS traffic being higher than, lower than, or equal to the priority of unicast traffic;
reporting information of a terminal about priority of MBS traffic and priority of unicast traffic;
a priority threshold for MBS traffic;
a priority threshold for unicast traffic; and a priority threshold for MBS traffic and a priority threshold for unicast traffic.

13. The method according to claim 1, wherein after the transmitting the configuration information from the DU to the CU, the method further comprises:

transmitting target configuration information to a terminal from the CU by using any one of the following:

broadcast radio resource control RRC signaling, multicast RRC signaling, dedicated RRC signaling, and a system information block SIB, wherein the target configuration information comprises the configuration information related to the MBS traffic, or the target configuration information comprises updated configuration information related to the MBS traffic.

14. The method according to claim 1, wherein before the transmitting information about multicast broadcast service MBS traffic from the CU to the DU, the method further comprises:

performing, by the CU, a first operation, wherein the first operation comprises any one of the following:

determining to transmit the MBS traffic in the first mode; and determining to switch a transmission mode of the MBS traffic to the first mode.

15. The method according to claim 14, wherein the performing a first operation comprises:

performing, by the CU, the first operation based on at least one of the following:

MBS traffic interest information collected by the CU;

a suggestion request of the DU;

MBS traffic measurement information reported by the DU; and auxiliary information or request information transmitted by a core network node.

16. The method according to claim 15, wherein a collection manner for the MBS traffic interest information comprises at least one of the following:

the CU triggers the terminal to report the MBS traffic interest information; and the terminal actively reports the MBS traffic interest information.

17. The method according to claim 15, wherein a trigger condition for the suggestion request of the DU comprises at least one of the following:

usage of a target resource meets a first preset condition;

transmission efficiency of a target resource meets a second preset condition; and a feedback status of the terminal meets a third preset condition.

18. The method according to claim 1, further comprising:

transmitting second signaling from the CU to the DU, wherein the second signaling is used to configure MBS traffic measurement information.

19. The method according to claim 18, wherein the MBS traffic measurement information comprises at least one of the following:

total resource occupancy of MBS traffic in the PTM mode and/or the PTP mode;

resource occupancy of each MBS traffic in the PTM mode and/or the PTP mode;

resource occupancy of MBS traffic in a preset MBS traffic list in the PTM mode and/or the PTP mode;

total resource occupancy of MBS traffic in the PTP mode for each or a given terminal;

resource occupancy of each MBS traffic in the PTP mode for each or a given terminal;

resource occupancy of MBS traffic in a preset MBS traffic list in the PTP mode for each or a given terminal;

feedback information for MBS traffic in the PTM mode;

for MBS traffic in the PTP mode, terminal information that is specified or meets a fourth preset condition and that is configured to be reported;

total number of active terminals for MBS traffic in the PTM mode;

number of active terminals for each MBS traffic in the PTM mode;

number of active terminals for given MBS traffic in the PTM mode;

number of active terminals for MBS traffic in a preset MBS traffic list in the PTM mode;

hardware load of the PTM mode and/or the PTP mode; and remaining capacity of the PTM mode and/or the PTP mode.

20. A base station, comprising a processor, a memory, and a program or instructions stored in the memory and capable of running on the processor, wherein when the program or instructions are executed by the processor, the following steps are implemented:

transmitting information about multicast broadcast service MBS traffic from the CU to the DU, wherein the information about MBS traffic is used to indicate that the DU transmits MBS traffic in a first mode;

generating configuration information related to the MBS traffic in the DU; and transmitting the configuration information from the DU to the CU;

wherein the CU further transmits any one of the following:

information about whether the MBS traffic is able to be overridden by other MBS traffic and/or unicast traffic; and information about whether the MBS traffic is able to override other MBS traffic and/or unicast traffic.

* * * * *